(12) United States Patent
Smith

(10) Patent No.: US 11,219,913 B2
(45) Date of Patent: Jan. 11, 2022

(54) WHEEL GUARD TO SHIELD WHEELS FROM TIRE DRESSING

(71) Applicant: William Allen Smith, Sacramento, CA (US)

(72) Inventor: William Allen Smith, Sacramento, CA (US)

(*) Notice: Subject to any disclaimer, the term of this patent is extended or adjusted under 35 U.S.C. 154(b) by 432 days.

(21) Appl. No.: 16/359,135

(22) Filed: Mar. 20, 2019

(65) Prior Publication Data
US 2020/0298265 A1 Sep. 24, 2020

(51) Int. Cl.
*B05B 12/30* (2018.01)
*B60B 7/00* (2006.01)
*B60B 7/06* (2006.01)
*B60B 7/04* (2006.01)
*B60B 7/08* (2006.01)

(52) U.S. Cl.
CPC ............... *B05B 12/30* (2018.02); *B60B 7/00* (2013.01); *B60B 7/04* (2013.01); *B60B 7/06* (2013.01); *B60B 7/08* (2013.01)

(58) Field of Classification Search
CPC ......... B60B 7/00; B60B 7/063; B60B 7/0066; B60B 7/0026; B60B 7/04; B60B 7/06; B60B 7/08; F41H 5/08; B05B 12/30
See application file for complete search history.

(56) References Cited

U.S. PATENT DOCUMENTS

| | | | | |
|---|---|---|---|---|
| 1,481,363 A * | 1/1924 | Hall | ..................... | G09F 21/045 40/587 |
| 2,650,862 A * | 9/1953 | Lyon | ........................ | B60B 7/00 301/37.26 |
| 4,792,191 A * | 12/1988 | Farmer | .................. | B05B 12/30 301/37.102 |
| 6,485,106 B1 * | 11/2002 | Hermansen | ........... | B60B 7/0066 301/37.103 |
| 8,496,300 B2 * | 7/2013 | Nebel | ....................... | B60B 7/02 301/37.104 |
| 8,556,351 B1 * | 10/2013 | Uhlin | ....................... | B60B 7/04 301/37.104 |
| 9,140,525 B2 * | 9/2015 | Yakoub | ..................... | F41H 5/08 |
| 2007/0013266 A1 * | 1/2007 | Chang | ................... | B06B 1/0292 310/311 |
| 2015/0104577 A1 | 4/2015 | Doyal | | |
| 2015/0239287 A1 * | 8/2015 | Young | ................... | B60B 7/0066 301/37.102 |
| 2021/0061002 A1 * | 3/2021 | Vela | ......................... | B60B 7/16 |

* cited by examiner

*Primary Examiner* — Scott A Browne
(74) *Attorney, Agent, or Firm* — Dunlap Bennett & Ludwig, PLLC

(57) ABSTRACT

A wheel guard includes a cover having a cone shape with an outer surface, an inner surface, a top end, a bottom rim, a first terminal edge running from the top end to the bottom rim, and a second terminal edge opposite the first terminal edge and running from the top end to the bottom rim. A coupler is configured to releasably couple the first terminal edge to a plurality of different radial points of the cover, thereby adjusting a diameter of the bottom rim.

4 Claims, 4 Drawing Sheets

WHEEL GUARD TO SHIELD WHEELS FROM TIRE DRESSING

BACKGROUND OF THE INVENTION

The present invention relates to protecting wheels from tire shine dressing and, more particularly, to a wheel guard is used to shield wheels from tire shine dressing.

Typically, wheels and tires are cleaned and dressed after washing and detailing a car. Cleaning and dressing wheels and tires can take around 30 to 45 minutes. While using spray on tire shine, some of the spray adheres to the cleaned wheels which causes road dust, and brake dust to adhere and accumulate on the wheels. Therefore, the wheels appear dirty within a short period of driving after they have been cleaned.

As can be seen, there is a need for wheel guard use to shield wheels from tire shine dressing.

SUMMARY OF THE INVENTION

In one aspect of the present invention, a wheel guard comprises: a cover having a cone shape with an outer surface, an inner surface, a top end, a bottom rim, a first terminal edge running from the top end to the bottom rim, and a second terminal edge opposite the first terminal edge and running from the top end to the bottom rim; and a coupler configured to releasably couple the first terminal edge to a plurality of different radial points of the cover, thereby adjusting a diameter of the bottom rim.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a wheel guard, which is a tool used in auto detailing that covers wheels while applying spray on tire shine dressing. The wheel guard covers and seals wheels of any size preventing over spay of tire shine products from contaminating wheels while applying the spray to the tires. Using the tool thereby prevents road dust and brake dust from adhering to wheels which allows wheels to remain clean and shiny for an extended period of driving time after auto detailing is completed.

Figure 1:
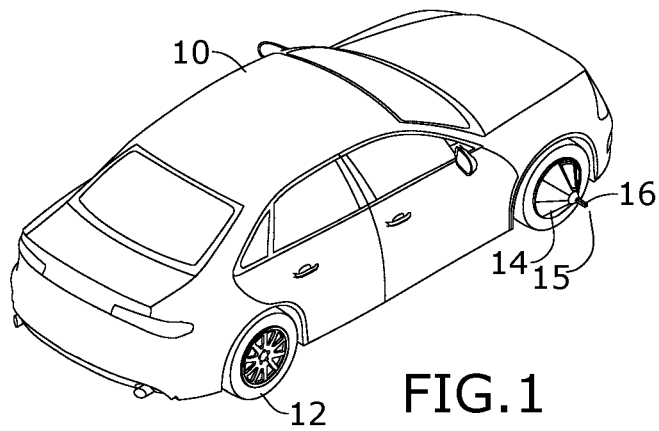
FIG. 1 is a perspective view of an embodiment of the present invention, shown in use.
Figure 2:
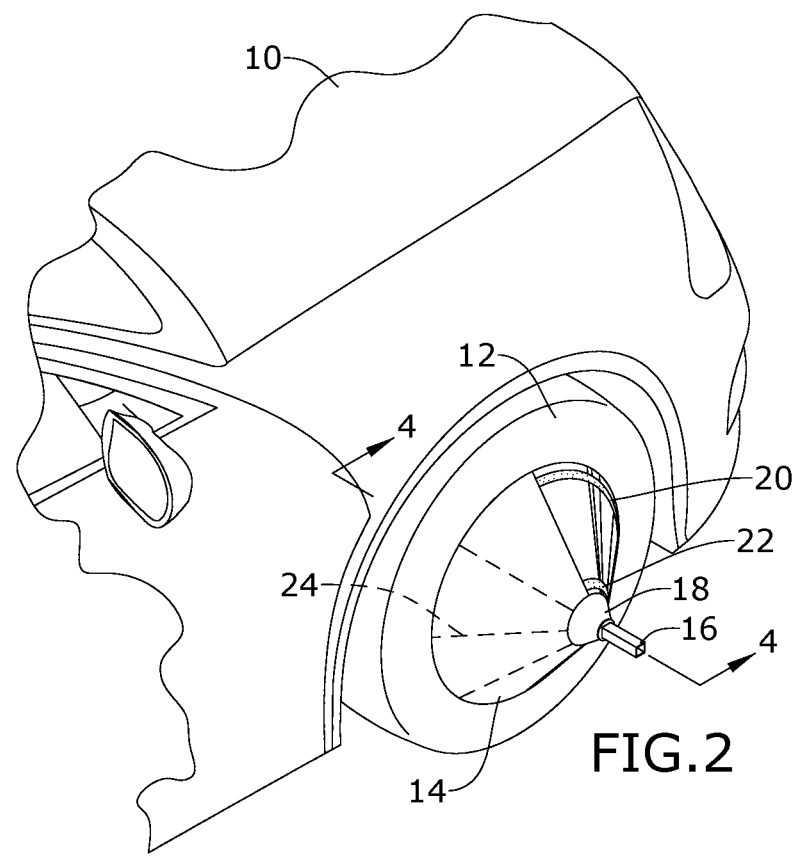
FIG. 2 is a perspective view of an embodiment of the present invention, shown in use.
Figure 3:
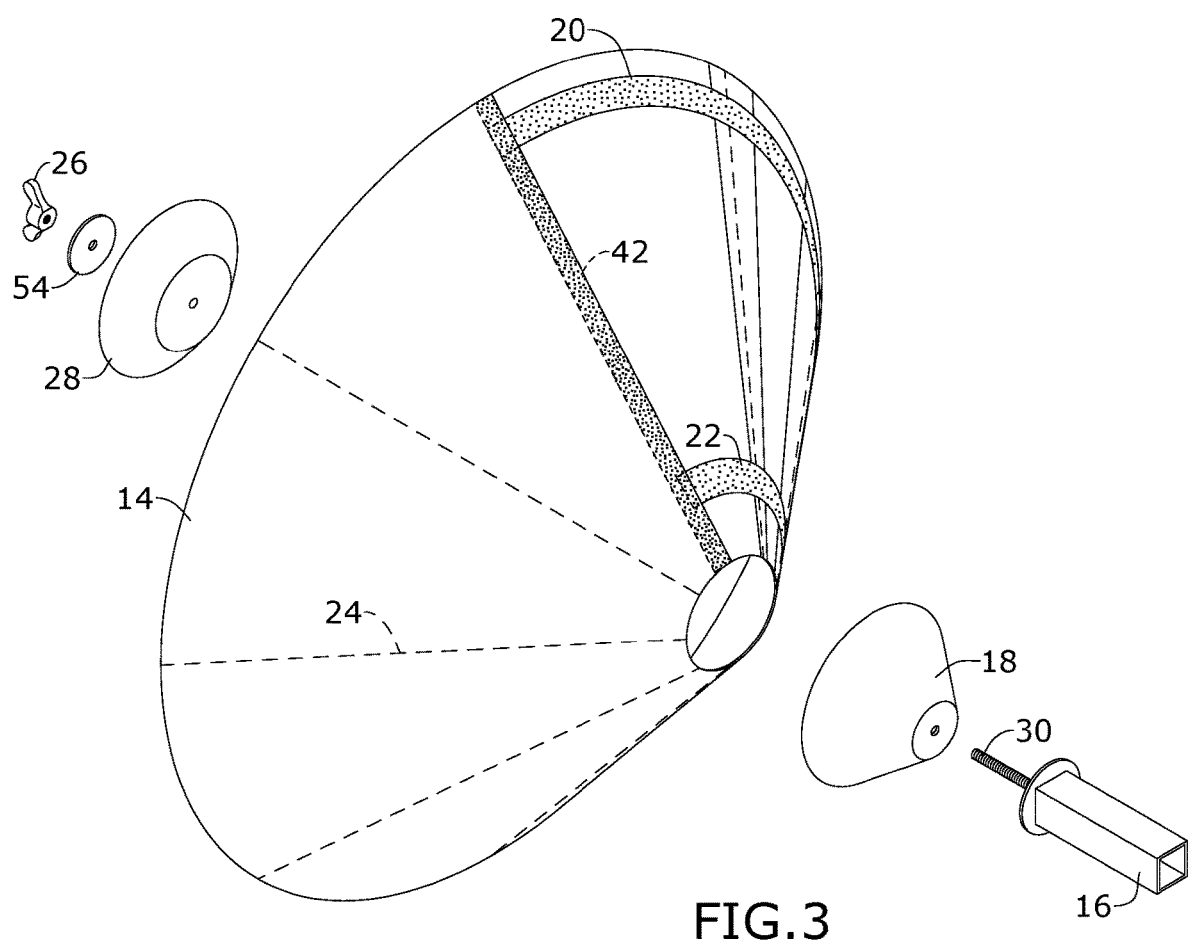
FIG. 3 is an exploded view of an embodiment of the present invention.
Figure 4:
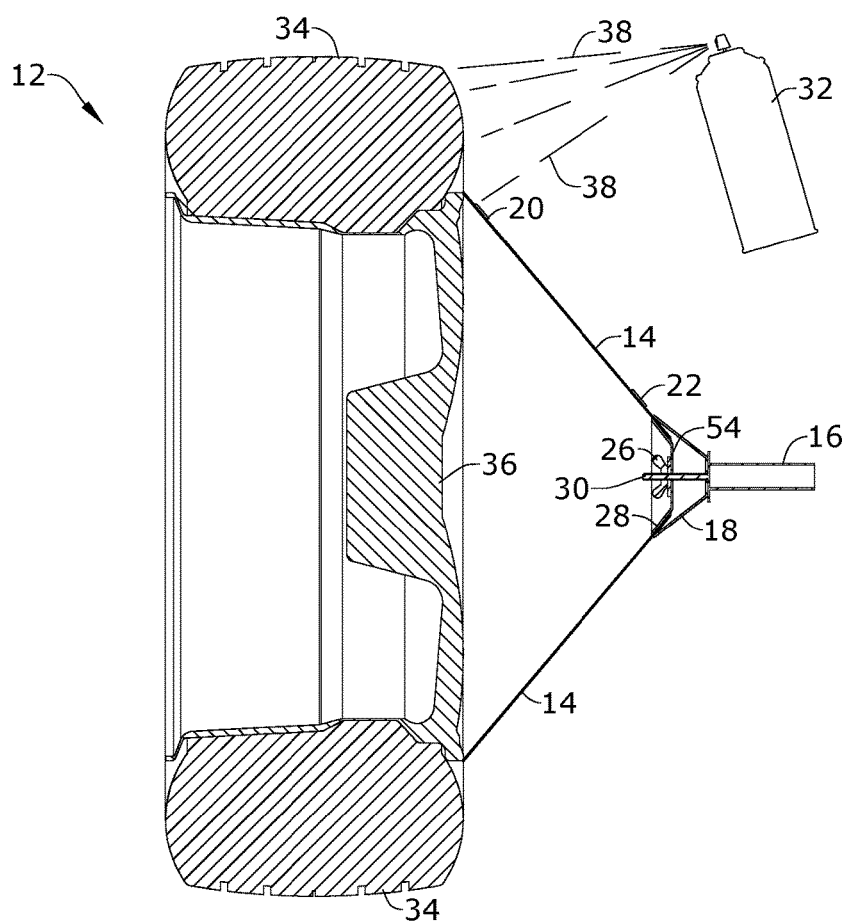
FIG. 4 is a section view of the present invention, taken along 4-4 in FIG. 2.
Figure 5:
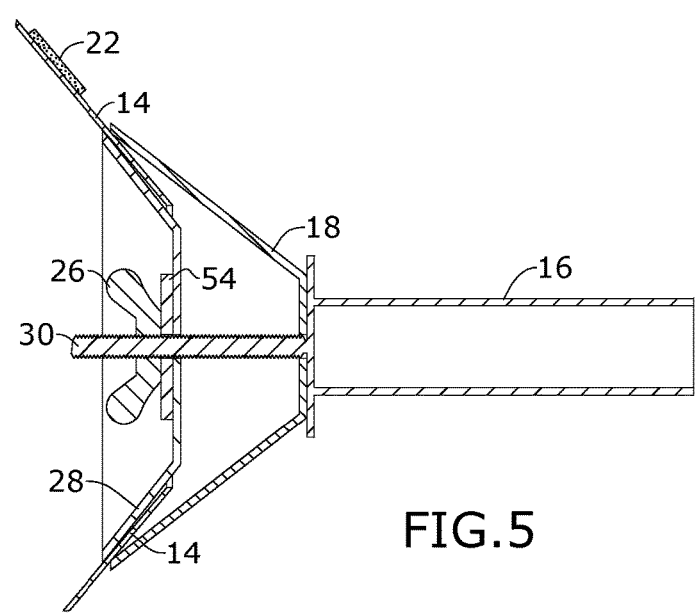
FIG. 5 is a detailed section view of an embodiment of the present invention.
Figure 6:
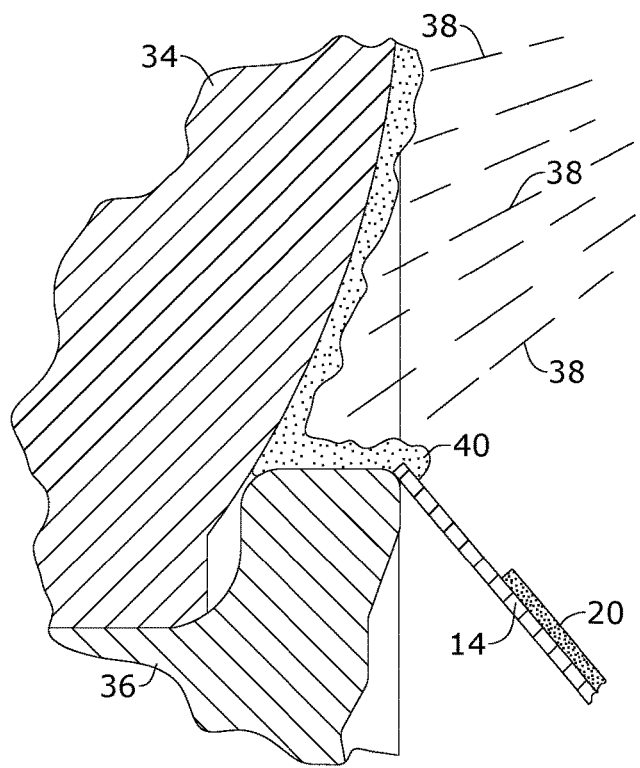
FIG. 6 is a detailed section view of an embodiment of the present invention.
Figure 7:
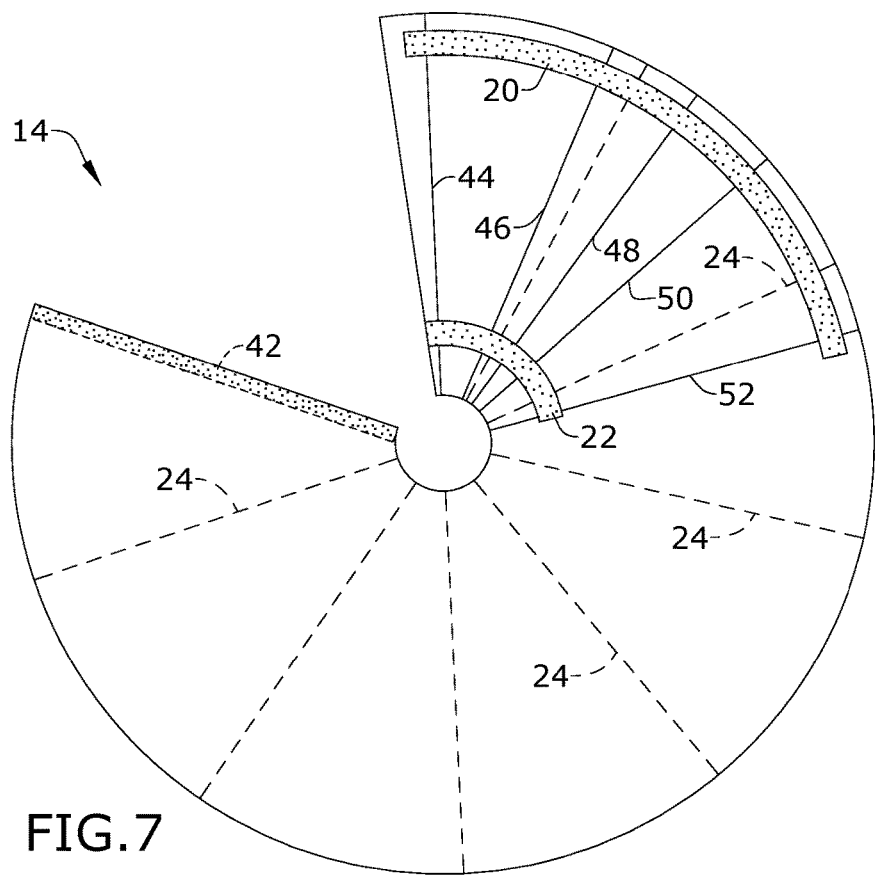
FIG. 7 is a top view of an embodiment of the present invention.

Referring to FIGS. 1 through 7, the present invention includes a wheel guard 15. The wheel guard 15 includes a cover 14 having a cone shape with an outer surface, an inner surface, a top end, a bottom rim, a first terminal edge running from the top end to the bottom rim, and a second terminal edge opposite the first terminal edge and running from the top end to the bottom rim. A coupler 20, 22, 42 is configured to releasably couple the first terminal edge to a plurality of different radial points of the cover 14, thereby adjusting a diameter of the bottom rim.

The wheel guard 15 may further include a handle 16 used to manipulate the cover 14 while in use. The handle 16 may be releasably coupled to the top end of the cover 14. In certain embodiments, the top end includes a top rim defining an opening. An outer coupler 18 having a cone shape includes an inner opening and an outer rim. An inner coupler 28 having a cone shape includes an inner opening and an outer rim. The outer coupler 18 is disposed over the outer surface at the top end of the cover 14. The inner coupler 18 is disposed against the inner surface at the top end of the cover 14. A bolt 30 of the handle 16 runs through the inner opening of the outer coupler 18, the opening of the top rim, and the inner opening of the inner coupler 28. A washer 54 is placed around the end of the bolt 30 and a wingnut 26 is threadably attached to the end of the bolt 30, releasably securing the handle 16 to the cover 14.

The cover 24 may be made of cardboard, nylon, or other solid and bendable materials. In certain embodiments, the cover 14 is made up of a plurality of panels connected together by a plurality of radial fold lines 24. The cover 14 may thereby include a compressed configuration and a deployed configuration. The deployed configuration includes the cover 14 in the cone shape, the coupler 20, 22, 42 releasably securing the first terminal edge to another portion of the cover 14, and the handle 16 coupled to the top end. The compressed configuration includes the handle 16 removed, the coupler 20, 22, 42 detached, and the plurality of panels folded upon themselves along the fold lines 24. The compressed configuration is for when the wheel guard 15 is not in use and stored away.

The coupler 20, 22, 42 may include a first hook and loop attachment 42 attached to the inner surface at the first terminal edge, and a second hook and loop attachment 20, 22 attached to the outer surface of the cover 14. The first hook and loop attachment 42 may be a strip including one of a hook connector and a loop connector running along a radial line of the cover 14. The second hook and loop attachment 20, 22 may include a first strip 20 and a second strip 22 circumferentially coupled to the outer surface starting at the second terminal edge. The first strip 20 may be near the bottom rim and the second strip 20 may be near the top end. The first strip 20 and the second strip 22 may include the other of the hook connector and the loop connector. Therefore, the first hook and loop attachment 42 releasably secures to the first strip 20 and the second strip 22.

In certain embodiments, the cover 14 may include a plurality of radial markings 44, 46, 48, 50, 52 disposed on the outer surface. The radial markings 44, 46, 48, 50, 52 may include radial lines that identify sizes of the diameter when the first terminal edge is coupled to the cover 14 at that point. The radial markings 44, 46, 48, 50, 52 may correspond with common wheel sizes. For example, the radial markings 44,

46, 48, 50, 52 may include a 22" wheel line 44, a 20" wheel line 46, an 18.5" wheel line 48, an 18" wheel line 50, and a 16" wheel line 52.

A method of using the present invention may include the following. A user may use the wheel guard 15 as tool while detailing an automobile 10 after washing and drying. It can typically take 30 to 45 minutes to clean and dress custom rims 36 and tires 34 of wheels 12 after washing and detailing any automobile 10. A user may assemble the wheel guard 15 and adjust the diameter of the bottom rim to correspond with the size of the wheels 36 of the automobile 10. The user may then place the cover 14 over the wheel 36 and begin to spray the tires 34 with a spray 38 and foam 40 from a pressurized container 32. The wheel guard 15 prevents the spray 38 and foam 40 from hitting the wheels 36, and cuts tire dressing time down to 30 seconds per tire.

It should be understood, of course, that the foregoing relates to exemplary embodiments of the invention and that modifications may be made without departing from the spirit and scope of the invention as set forth in the following claims.

What is claimed is:

1. A wheel guard comprising:
    a cover having a cone shape with an outer surface, an inner surface, a top end, a bottom rim, a first terminal edge running from the top end to the bottom rim, and a second terminal edge opposite the first terminal edge and running from the top end to the bottom rim;
    a coupler configured to releasably couple the first terminal edge to a plurality of different radial points of the cover, thereby adjusting a diameter of the bottom rim;
    a handle releasably coupled to the top end, wherein the top end comprises a top rim defining an opening;
    an outer coupler comprising an inner opening and an outer rim; and
    an inner coupler comprising an inner opening and an outer rim, wherein
    the outer coupler is disposed over the outer surface at the top end of the cover,
    the inner coupler is disposed against the inner surface at the top end of the cover,
    a bolt of the handle runs through the inner opening of the outer coupler and the inner opening of the inner coupler; and
    a nut is threadably attached to an end of the bolt, releasably securing the handle to the cover.

2. The wheel guard of claim 1, wherein the coupler comprises a first hook and loop attachment attached to the inner surface at the first terminal edge, and a second hook and loop attachment attached to the outer surface of the cover.

3. The wheel guard of claim 2, wherein the second hook and loop attachment comprises a first strip circumferentially coupled to the outer surface near the bottom rim and a second strip circumferentially coupled to the outer surface near the top end.

4. The wheel guard of claim 1, further comprising radial markings disposed on the outer surface and identifying a size of the diameter if the first terminal edge is coupled at that point.

* * * * *